(No Model.)
C. SHUMAN.
FILTER.
No. 458,667. Patented Sept. 1, 1891.
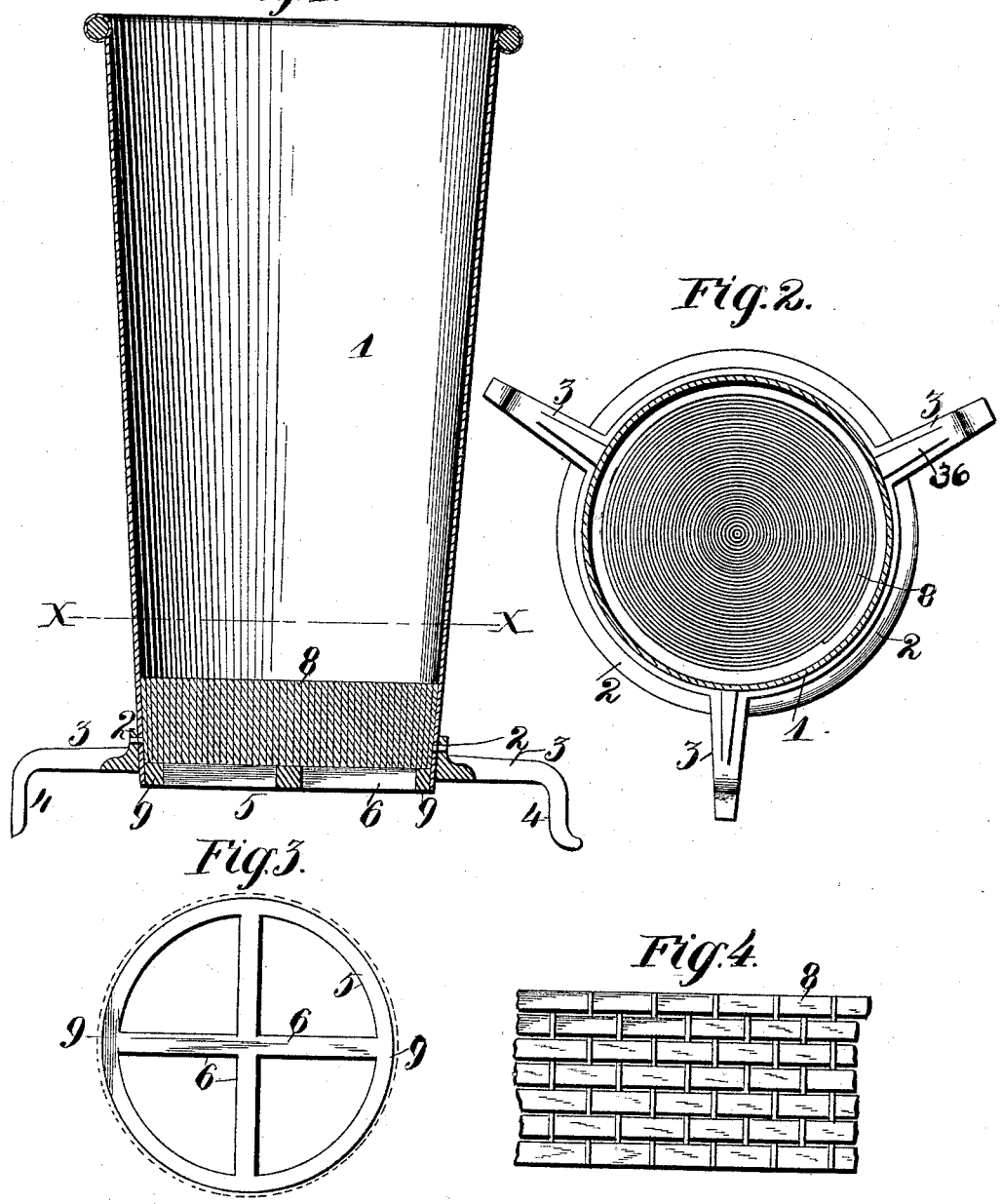
WITNESSES:
INVENTOR
Charles Shuman.
BY Higdon & Higdon
ATTORNEYS

UNITED STATES PATENT OFFICE.

CHARLES SHUMAN, OF ST. LOUIS, MISSOURI.

FILTER.

SPECIFICATION forming part of Letters Patent No. 458,667, dated September 1, 1891.

Application filed December 8, 1890. Serial No. 373,955. (No model.)

*To all whom it may concern:*

Be it known that I, CHARLES SHUMAN, of the city of St. Louis, in the State of Missouri, have invented certain new and useful Improvements in Filters, of which the following is a full, clear, and exact description, reference being had to the accompanying drawings, forming a part hereof.

My invention relates to improvements in filters; and it consists in the novel construction and combination of parts, as will be more fully hereinafter specified, and designated in the claims.

In the drawings, Figure 1 is a vertical longitudinal mid-section of the receptacle, filtering medium, support for the same, and stand. Fig. 2 is a horizontal section taken on the line $xx$ of Fig. 1. Fig. 3 is a top plan view of the skeleton disk or support for the filtering medium detached. Fig. 4 is a side elevation of a part of the filtering material enlarged, showing its fibrous or stranded structure.

The object of my invention is to construct a filter simple in mechanical construction and thoroughly practical in its operation.

Referring to the drawings, 1 represents a receptacle in which the water or liquid to be filtered is received. Said receptacle is the shape of an inverted frustum of a cone, the smaller diametrical dimension thereof forming the base of the receptacle. It may also be made in a cylindrical or any other suitable and desired form; but is preferably made to hold an ordinary pailful or bucketful of water. However, the size is immaterial, as its functional operation is the same, whether made of any particular shape or definite dimensions. Said receptacle is mounted upon a base or stand 2, the lower edge of said receptacle projecting a little distance below the lower edge of the body of said stand, but not to a sufficient extent as to come in contact with the floor or whatever body the stand or support is placed upon. Said stand or support is provided with three or four or any suitable number of outwardly-projecting arms 3, which arms are provided at their outer terminal portions with downwardly-bent projections 4, which projections rest on the floor, or whatever object they are placed upon, thereby holding the lower or basic portion of the receptacle ajar from the said floor. Said stand or support is further provided with lugs 36, which are cast integral therewith and project upwardly from the upper side thereof and by means of which the receptacle and tank are held in proper juxtaposition, and united by suitable rivets or other devices being passed through apertures in said lugs and made to engage with said receptacle; but it will be seen that no other fastening device than the tapering receptacle itself is needed to secure it in place in the supporting-stand 2, because such form "wedges" itself in the limited opening therefor in said frame, and thereby holds said receptacle at just the proper height above the floor or supporting-surface upon which the filter may be located, the size of the opening being of course predetermined and made to correspond to the size of the receptacle. This last construction permits the ready withdrawal of the receptacle from the supporting-stand at any requisite time and yet properly holds the receptacle in position.

5 indicates a skeleton disk or support secured in the lower terminal portion of receptacle 1 in such a manner as to form a water-tight joint between its external periphery and the internal circumferential surface of the receptacle. Said disk is provided with a rim 9, and also with centrally-diverging radial arms 6, all of which answer as a basic support for the filtering medium or material. It is evident that no other support for the skeleton disk is necessary than that afforded by the tapering internal walls of the receptacle.

8 indicates a volute coil of fibrously-constructed medium, which I employ for filtering medium or material. Said substance is woven out of cotton strands, some of which strands run longitudinally with said tape and others transversely with the same, thereby forming an intertwined and knitted structure. The longitudinal strands are larger and situated closer together in the tape than the transverse strands, and they (the longitudinal strands) essentially perform the filtering function, while the function of the the transverse strands is simply to hold or intertwine the longitudinal strands together. Said volute coil 8 is made out of a fibrously-constructed tape, as aforesaid, and wound loosely or tightly, according to the amount or degree of rapidity of the percolation of water therethrough, as is desired by the operator.

If it is desired to carry on the filtering process slowly, the tape is wrapped in a tight volute coil and pressed down in the receptacle in its normal position, whereby the porous structure of said volute coil is rendered more minute, whereas if it is desired to filter water or other fluid rapidly the coil is wrapped loosely and placed in its normal position in the receptacle, whereby the porous structure of said volute coil of tape is not diminished and the water or liquid is permitted to percolate through said coil more rapidly. If it is desired, however, to filter the water rapidly in place of going through the operation as above stated, the operator can use only part of the coil wrapped in a volute form and leave the remaining part extending freely in the receptacle. When this operation is effected, where the tape diverges from the volute coil a space is formed between the external surface of said coil and the internal surface of the receptacle, which would permit the water to pass through unfiltered if said space is not inclosed. To inclose this space, a part of the coiled portion of the tape is pressed down in said space, thereby filling it up and not permitting the water to pass through unfiltered. The rim of the skeleton disk 5 will also prevent the liquid from passing down between the exterior surface of the coil and the interior surface of the receptacle.

It will be seen from the foregoing description that the walls of the receptacle 1 are tapering, and that the coil or strip 8 of filtering material will be compressed layer upon layer by the act of placing in the receptacle, and that when thus placed in position and compressed and water or other liquid to be filtered is thrown into the receptacle it will be received upon the edge of each layer of the strip and pass directly through the strip edgewise, entering one edge and passing out at the opposite edge. The strip being compressed by the receptacle, it should be clear that no liquid, or at least very little, can pass between the layers and must all pass edgewise through the same, and that the width of the strip from one edge to the other being considerable the liquid will be compelled to traverse a considerable thickness of filtering material before it is discharged, and must therefore be pretty thoroughly filtered during such passage. The strip of tape 8, it will be noticed, has edges, and has what I may term "flat" sides, and in use these flat sides are placed side by side during the rolling operation and the layers of the continuous strip are then compressed flat side to flat side, the pressure being applied laterally, not vertically nor from below.

The peculiar value of my improved filter lies in the ease with which the filtering material may be taken out of the receptacle and washed and replaced.

The filtering-disk is easily unrolled and washed and replaced, a few moments only being required to do the work, which is an object when the filtering material has to be cleaned many times a day.

Having given an explicit description of my invention, I will now proceed to describe its application and use. The parts are constructed as heretofore described. The tape or filtering medium is wrapped in a volute coil and placed in the bottom of the receptacle. The inequality of the diametrical dimension of said receptacle will hold said coil in its normal position when it is pushed down and placed therein. After the volute coil and filtering medium has been placed in its functional and normal position, as stated, the water to be filtered is poured into said receptacle and the process of filtration takes place. When it is desired to clean said coil of tape and filtering medium, it is removed from the receptacle, unrolled, and washed in any suitable and effective manner. The frequency of washing said coil depends upon the condition of the water and the amount that is filtered therethrough. However, the sound judgment and discretion of the operator will suggest the frequency of washing and cleaning said filtering medium.

I am aware that a loose coil of horse-hair has been placed within a filtering-tank and supported therein upon the under surface of a wooden partition by means of headed nails driven through said coil into said wooden partition, and that the same has been used in connection with a finer filtering medium of gravel, sand, &c., and through which the water has been forced upwardly; but in such construction the horse-hair coil was of such coarse material and was so loosely plaited as to permit the passage therethrough of a considerable amount of impurities, and had therefore to be used in connection with sand, &c., as above stated, in order to properly filter the water, and entailing the well-known inconveniences which a body of same possesses.

It is obvious that my improved tapering receptacle and tightly-edged-rolled coil of woven textile material needs no other support than that afforded by the receptacle itself, the said coil being tightly compressed in the receptacle by the simple act of placing the coil therein, and from whence it may readily and quickly be removed for washing, &c., without disturbing any other portion of the filter.

It will be observed that the filtering material which I employ is composed, not wholly of longitudinal strands plaited together, but is composed of comparatively straight longitudinal strands running directly through from end to end of the material and a series of transverse strands running in a straight line across the longitudinal strands and at a right angle thereto.

Having fully described my invention, what I claim is—

1. The improved filter wherein are a series of layers of textile strips, as 8, having longitudinal strands and separate transverse strands, said transverse strands passing across said longitudinal strands at right angles, said strips being placed side by side with their respective flat sides together and supported in a suitable casing, so that the water to be filtered will enter the edges of the strips and pass edgewise directly through the same and make its exit therefrom through the edges opposite those which it entered, substantially as shown and specified.

2. The improved filter wherein are a series of layers of textile strips, as 8, having longitudinal strands and transverse strands, said transverse strands passing across said longitudinal strands, the said longitudinal strands thereof being of greater transverse dimensions than the transverse strands, said strips being placed side by side with their flat sides together and supported within a suitable casing, so that the water to be filtered will enter the edges of the strips and pass through the same directly from edge to edge and pass out at the opposite edges, substantially as shown and specified.

3. The improved filtering material consisting of a series of layers of textile strips, as 8, having longitudinal strands and transverse strands, the last-named strands passing across the longitudinal strands, said strips being placed side by side with their flat sides together, in combination with a casing and means for compressing said strips and urging their flat sides into intimate contact throughout their adjacent contacting surfaces, substantially as shown and specified.

In testimony whereof I affix my signature in presence of two witnesses.

CHARLES SHUMAN.

Witnesses:
E. E. LONGAN,
E. W. KELLER.